*(12)* United States Patent
Jarr

(10) Patent No.: US 12,158,746 B2
(45) Date of Patent: Dec. 3, 2024

(54) METHOD FOR MAINTAINING SYSTEMS, IN PARTICULAR MACHINES IN WAREHOUSES

(71) Applicant: Dematic GmbH, Heusenstamm (DE)

(72) Inventor: Daniel Jarr, Offenbach (DE)

(73) Assignee: Dematic GmbH, Heusenstamm (DE)

( * ) Notice: Subject to any disclaimer, the term of this patent is extended or adjusted under 35 U.S.C. 154(b) by 611 days.

(21) Appl. No.: 17/231,731

(22) Filed: Apr. 15, 2021

(65) Prior Publication Data

US 2021/0325856 A1 Oct. 21, 2021

(30) Foreign Application Priority Data

Apr. 17, 2020 (DE) .......................... 102020110501.0

(51) Int. Cl.
*G05B 19/418* (2006.01)
*G05D 1/00* (2024.01)
(Continued)

(52) U.S. Cl.
CPC ... *G05B 19/4184* (2013.01); *G05B 19/41815* (2013.01); *G05B 19/4185* (2013.01);
(Continued)

(58) Field of Classification Search
CPC .......... G05B 19/41815; G05B 19/4184; G05B 19/4185; G05B 2219/32233; G05B 2219/32234; G05B 2219/40202; G05D 1/0022; G05D 1/0033; G05D 1/0285; G06Q 10/20; H04W 12/63; H04W 4/029; H04W 24/00; H04W 72/00; H04W 76/00; H04W 80/00
See application file for complete search history.

(56) References Cited

U.S. PATENT DOCUMENTS 5,598,572 A 1/1997 Tanikoshi et al.
9,966,077 B2 5/2018 Nishikawa
(Continued)

FOREIGN PATENT DOCUMENTS

EP 1449041 B1 1/2008
EP 2703920 A1 3/2014
(Continued)

OTHER PUBLICATIONS

Decimeter-Level Localization with a Single WiFi Access Point, Deepak Vasisht et al., 13th USENIX Symposium on Networked Systems Design and Implementation, Mar. 16-18, 2017 (NSDI '16), pp. 165-178.

*Primary Examiner* — Kidest Bahta
(74) *Attorney, Agent, or Firm* — Gardner, Linn, Burkhart & Ondersma LLP

(57) ABSTRACT

A method for maintaining, commissioning and checking systems in warehouses, where a service technician has sight of the system in question and, by way of a mobile computer, makes wireless contact with the controller of the system in order to take control thereof, where taking control by the mobile computer is permitted by a central controller only if the service technician can have sight contact with the corresponding system, for which purpose localization services of a local radio network are used for the determination of the position and/or of the orientation of the mobile computer of the service technician.

17 Claims, 1 Drawing Sheet

(51) Int. Cl.
*G06Q 10/20* (2023.01)
*H04W 4/029* (2018.01)

(52) U.S. Cl.
CPC ......... *G05D 1/0022* (2013.01); *G05D 1/0033* (2013.01); *G05D 1/0285* (2013.01); *G06Q 10/20* (2013.01); *H04W 4/029* (2018.02); *G05B 2219/32233* (2013.01); *G05B 2219/32234* (2013.01); *G05B 2219/40202* (2013.01)

(56) References Cited

U.S. PATENT DOCUMENTS

| | | | |
|---|---|---|---|
| 10,521,626 | B2 | 12/2019 | Hamer et al. |
| 2006/0228005 | A1 | 10/2006 | Matsugu et al. |
| 2007/0004381 | A1* | 1/2007 | Larson ............... G06F 21/35 |
| | | | 455/411 |
| 2009/0084657 | A1 | 4/2009 | Brandt et al. |
| 2013/0024495 | A1* | 1/2013 | Armstrong ......... G05B 19/0426 |
| | | | 709/201 |
| 2013/0211977 | A1* | 8/2013 | Lyon ............... G06Q 10/0875 |
| | | | 705/29 |
| 2013/0344862 | A1* | 12/2013 | Alameh ................ G06F 3/011 |
| | | | 455/418 |
| 2014/0028441 | A1 | 1/2014 | Amran |
| 2014/0191848 | A1* | 7/2014 | Imes ................. H04B 5/0031 |
| | | | 340/10.5 |
| 2016/0009493 | A1* | 1/2016 | Stevens ............... B65G 1/1373 |
| | | | 700/216 |
| 2016/0019737 | A1* | 1/2016 | Stagg ............... H04W 52/0235 |
| | | | 340/5.61 |
| 2016/0274586 | A1* | 9/2016 | Stubbs ................ B25J 9/1676 |
| 2017/0124362 | A1* | 5/2017 | Sheng ................ G06K 7/10396 |
| 2017/0158431 | A1* | 6/2017 | Hamilton .......... G05B 19/41895 |
| 2017/0166400 | A1* | 6/2017 | Hofmann ............ B65G 1/1378 |
| 2017/0323253 | A1* | 11/2017 | Enssle ................. B25J 9/1694 |
| 2018/0024247 | A1* | 1/2018 | Carter .................. G01S 19/09 |
| | | | 342/357.26 |

FOREIGN PATENT DOCUMENTS

| | | |
|---|---|---|
| EP | 3244641 A1 | 11/2017 |
| EP | 3534593 A1 | 9/2019 |

\* cited by examiner

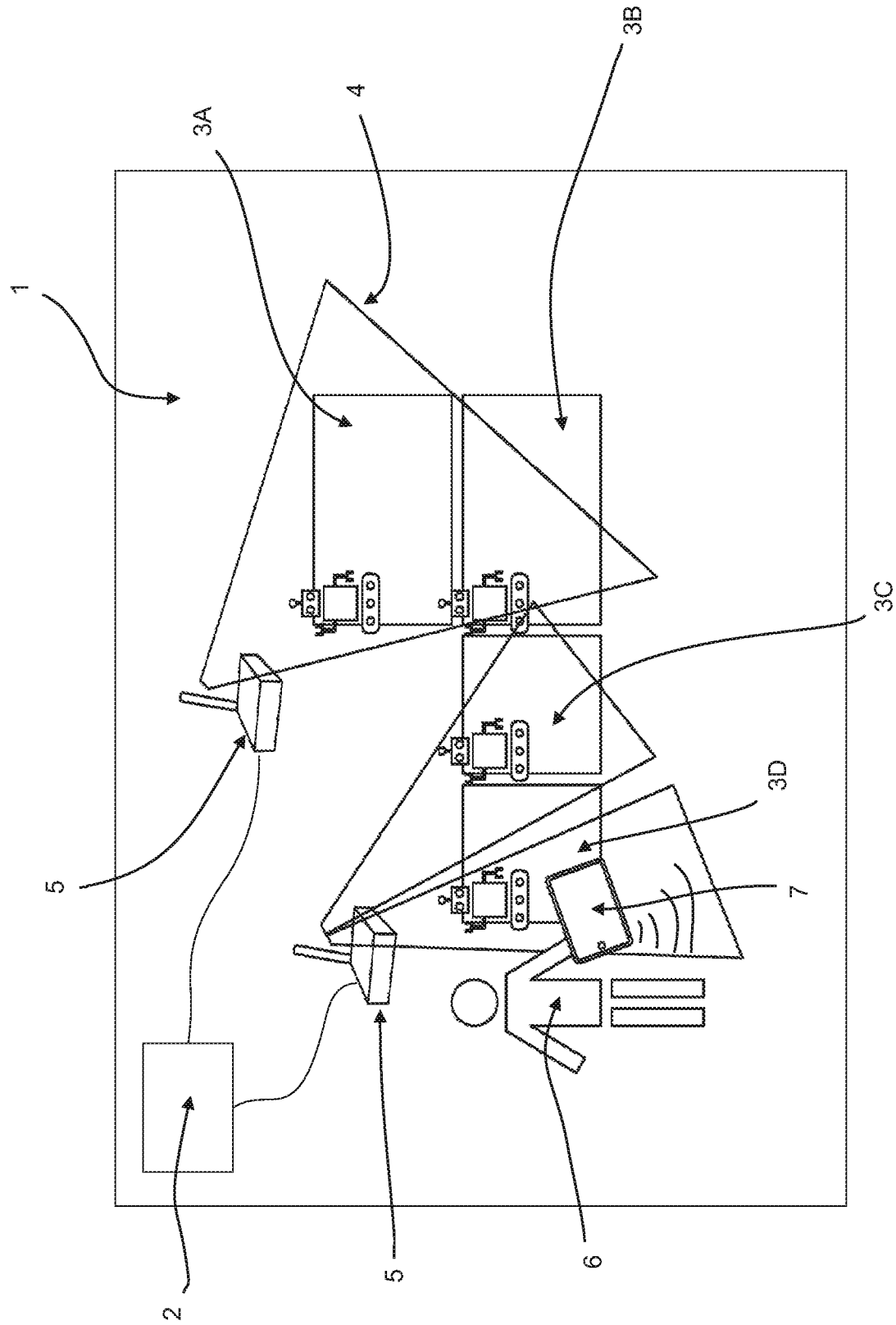

METHOD FOR MAINTAINING SYSTEMS, IN PARTICULAR MACHINES IN WAREHOUSES

CROSS REFERENCE TO RELATED APPLICATION

The present application claims the priority benefits of German Application No. 10 2020 110 501.0, filed on Apr. 17, 2020.

BACKGROUND AND FIELD OF THE INVENTION

The invention relates to a method for maintaining systems, in particular machines in warehouses.

Warehouses and their installations must be regularly inspected, maintained and monitored, subject to legal specifications, amongst other things. For this purpose, tablets or computers connected by a wired connection are usually used for the commissioning, testing and for the maintenance and repair of the machinery in a warehouse, wherein e.g. a service technician must plug the tablet into a socket in the proximity of the machine, select the machine using its ID and can then begin work in order to override or to control a machine manually.

Some service providers already use radio-based or WiFi-based connections for the service tablet. They otherwise function in a similar way to the wired solutions.

The legal regulations (e.g. DGUV regulations) prescribe that the machinery to be controlled must be physically visible to the service technician. In other words, it must be ensured that, even in the case of remote access via a laptop, tablet, smartphone, etc., the technician has the machine in view or that this machine is visible.

Thus, these solutions do not always meet the regulations, since it cannot be ensured technically that the service technician actually has the machine in sight when using a radio connection.

US 2009/0084657 A1 describes a modular conveying system which comprises a plurality of conveying modules and a plurality of wireless machine communication points which are disposed on the plurality of conveying modules and are designed to communicate wirelessly via a machine network.

U.S. Pat. No. 10,521,626 B2 discloses a material handling system with one or a plurality of sub-systems, and one or a plurality of sensor panels are available. Each sensor panel can determine whether a mode control token is located in the proximity of the respective sensor panel. When a mode control token is in the immediate proximity of the respective sensor panel, the sensor panel can generate a signal, and, when the mode control token is outside the proximity of the respective sensor panel, the generation of the signal is stopped. The material transport system can also contain a processor which makes it possible for at least one or a plurality of sub-systems of the material transport system to be activated in response to the generated signals or to be stopped owing to the absence of the signals.

EP 1 449 041 B1 describes the possibility of permitting control of a machine only when access is obtained via a prescribed access point of the network. It is then assumed that the service technician is located in the surrounding area. This manner of proceeding is relatively imprecise.

SUMMARY OF THE INVENTION

In contrast, the present invention provides a method for the maintenance of machines in warehouses, in which the visibility of the machine to the service technician is ensured or is at least provided with a high level of probability.

It has been recognized in accordance with an aspect of the invention that if taking control by the mobile computer is permitted by a central controller only if the service technician can have sight contact with the corresponding system or machine system, for which purpose localization services of a local radio network are used for the determination of the position and/or of the orientation of the mobile computer of the service technician, it is possible actually to ensure the visibility of the system by proximity of the service technician or of his operating device in the form of the mobile computer in a simple way wirelessly. In other words, the possibilities of localization via local private radio networks are used to accelerate and to simplify maintenance and to make it more secure.

Ensuring sight contact with the system is preferably improved by means of a high level of precision in the localization. This is the case when the precision and/or the resolution of the localization comprises a range of up to a maximum of 3 meters and in particular a maximum of 1.5 meters, most particularly preferably a maximum of 0.5 meters. The position and/or the orientation of the mobile computer of the service technician compared to the corresponding system, such as to a known or determined position of the corresponding system, can then be determined precisely and therefore also whether sight contact can or does exist. In particular, in so doing, consideration is given as to whether the determined position and/or orientation is within a range which makes possible any sight contact. This is to be stored and/or specified in the central controller depending on the system. The precision levels of the new radio technologies are sufficient for this purpose.

A possible local radio network is in particular a private radio network according to a mobile telephony standard or WLAN or WiFi. The modern, high-performance and precise mobile telephony standards 4G, LTE (4.XG), 5G and future versions and WLAN according to IEEE standard 802.11 (preferably ac and ax or newer, also known as WiFi 5 and WiFi 6) are particularly preferred. In addition, UWB or GNSS are also suitable as a private local radio network. Bluetooth, ZigBee and other connectionless and connected transmissions from point to point and ad-hoc or pico networks should be explicitly excluded therefrom.

With the new 5G mobile telephony standard and also even with LTE Advanced or Advanced Pro (referred to hereinunder for the sake of simplicity as 4.XG), as known e.g. from https://de.wikipedia.org/wiki/LTE-Advanced or from https://de.wikipedia.org/wiki/5G, latency times of a few milliseconds have data rates of up to 20 gigabits per second, an extremely high level of reliability in the networks and a very high level of positional precision.

It is preferable to use a virtual private mobile telephony network according to mobile telephony standard 4.XG and higher, since, in contrast to WLAN and Bluetooth, etc, this does not transmit in freely usable frequency ranges, but the advantage of e.g. 4.XG is that, in the case of the German Federal Network Agency, a frequency range is "reserved/hired" as a so-called campus network for the dedicated application and can then be used exclusively by no one else within the range. This increases security and ensures reliability and bandwidths. The low power requirement from R16 is still also highly relevant in the case of industrial applications.

The local private radio network is consequently installed in a warehouse or industrial unit. The systems concerned accordingly originate from the field of conveying technology, warehousing technology, order-picking technology and/or sorting technology. Conveying technology systems are preferably any type of conveyors, in particular roller conveyors, belt conveyors, overhead conveyors, with or without deflectors and means for channelling items in and/or out.

Warehousing technology systems preferably include rack serving apparatuses, in particular shuttles and rack serving apparatuses, lifts for goods and/or shuttles. Order-picking technology includes manual, automated and/or robot-controlled order-picking stations and the controllers thereof, including intake and discharge means. Sorting technology comprises, in addition to continuous-loop sorters (tilt tray sorters, cross-belt sorters, Bombay sorters, push tray sorters) and linear sorters (slat and shoe sorters), also sequencing technology, such as sequencing towers, carousels, multi-stage sorting gyros, etc.

5G, WiFi6 and UWB use other wavelengths of the frequency bands which are no longer subject to interference owing to structures, articles etc. in the warehouse. In addition, they permit a high level of precision in the localization.

The mobile telephony positioning architecture makes localization or position determination possible, which is based both on mobile telephony signals and also on 3GPP-independent techniques in order to make possible a hybrid positioning scheme. Mobile telephony offers a high performance capability for localization since it opens up large bandwidths for a high temporal resolution, new frequency bands in the mm wavelength range, massive MIMO for precise angle measurement etc.

Such densely distributed access nodes in turn increase the line-of-sight (LoS) probability between the user nodes (UN) and the access nodes and thus make possible a highly precise estimation of the time of arrival (ToA). Access nodes with intelligent antenna solutions such as antenna arrays are also used, which for their part likewise make possible a precise estimation of the time of arrival (ToA).

In general, all the above-mentioned measurements, amongst others, can be estimated efficiently from uplink signals in a network-centred manner and so no additional position-related signals are necessary.

By means of modern WLAN-based methods, high levels of positioning precision can be achieved with analogue methods in order to be used for localization within the scope of the invention.

Thus e.g. from MIT the technology designated "Chronos" is known, with which resolutions in the decimetre range are possible (cf. "Decimeter-Level Localization with a Single WiFi Access Point", Deepak Vasisht et al, 13th USENIX Symposium on Networked Systems Design and Implementation (NSDI '16), pages 165-178).

Thus, by means of the present invention it is ensured with a high level of probability that the service technician has sight contact to the system because he is located in a specified position, which is determined by localization of his computer operating device. Only when he is located e.g. in the immediate proximity of the systems concerned in the field of conveying technology, warehousing technology, order-picking technology and/or sorting technology, is the remote access then granted.

In accordance with an aspect of the invention provision can additionally be made that, by reason of the location of the mobile computer determined by means of localization services of a radio network, a selection of reachable systems for maintenance is pre-selected and proposed to the service technician. Therefore, maintenance is speeded up considerably. It is also feasible for a maintenance connection to be made to the closest system automatically or to be cut when the visible range is exited.

It is possible at any point to retrieve documentation and system histories. By means of the localization, the selection of the retrievable documents can be significantly simplified. Fault documentation from the service technician, and remote support based on a pre-selected selection of experts/colleagues can hereby be rendered possible.

On the one hand, an access control can be integrated in the system in question itself or alternatively can be stored in the mobile computer or its programming. Furthermore, it is feasible for the determination of the location of the mobile computer to be effected by means of localization services by a superordinate controller, as may already be present as warehouse control software.

Further details of the invention will become clear from the following description of exemplified embodiments by reference to the accompanying drawing.

BRIEF DESCRIPTION OF THE DRAWINGS

FIG. 1 shows a schematic view of a warehouse with a plurality of conveying technology machines and a maintenance technician.

DESCRIPTION OF THE PREFERRED EMBODIMENTS

FIG. 1 schematically illustrates a warehouse designated as a whole by 1. The warehouse 1 comprises a superordinate controller 2 and a plurality of machines 3A, B, C, D connected thereto and a private local radio network 4 according to the 5G mobile telephony standard, which is accessed via routers 5 and covers the warehouse 1, i.e. the machines 3A, B, C, D are within the coverage of the 5G radio network. The routers 5 are connected to the superordinate controller 2. In the illustrated embodiment machines 3A, B, C, D comprise warehousing material conveying technology machines or machine systems.

A maintenance technician 6 works with the aid of a tablet computer 7 to do maintenance tasks on the conveying technology machines 3A, B, C, D. The tablet 7 also comprises, in addition to the maintenance software, a corresponding radio modem according to the 5G mobile telephony standard in order to be able to log into the radio network 4 and to communicate therein. By means of the superordinate controller 2 and the position data—provided by the 5G radio network 4 via the routers 5—of the tablet 7 which is logged into same, the location of the maintenance technician 6 and/or of his tablet 7 can be determined precisely.

Thus, when the technician 6 wishes to obtain access to the conveying technology machine 3D or the controller thereof, he must not only authenticate his identity and request access but also be located in a range which permits sight contact to the conveying technology machine 3D. In the present case, this is available only when he is located in the immediate proximity or surroundings of the machine 3D.

This checking and subsequent granting is effected via the superordinate controller 2 by means of the position data of the tablet 7 logged into the radio network 4. Only when the tablet 7 is subsequently located directly next to the machine 3D in question is maintenance access granted.

The embodiments of the invention in which an exclusive property or privilege is claimed are defined as follows:

1. A method for maintaining, commissioning and checking systems in warehouses by permitting a mobile computer of and transported by a service technician that makes wireless contact with a controller of the system take control of the system, said method comprising:
determining a position and/or an orientation of the mobile computer of the service technician in a warehouse by way of localization services of a private local radio network;
confirming the system in the warehouse for which control is sought is visible by the service technician based on the determined position and/or orientation of the mobile computer; and
permitting via a central controller the mobile computer to take control of the system upon said confirming the system is visible by the service technician based on the determined position and/or the orientation of the mobile computer of the service technician;
wherein the private local radio network is installed in the warehouse and the system in the warehouse comprises a conveying system, a warehousing system, an order picking system and/or a sorting system.

2. The method as claimed in claim 1, wherein a position of the mobile computer whereby the system is visible by the service technician is determined when the mobile computer is located in proximity to the system.

3. The method as claimed in claim 2, wherein a position of the mobile computer whereby the system is visible by the service technician is further determined based on a determined orientation of the mobile computer.

4. The method as claimed in claim 1, wherein said determining the position and/or the orientation of the mobile computer is carried out by a locating service on the mobile computer in the private local radio network, and the central controller permits or denies the taking of control of the system by the mobile computer on the basis of the result.

5. The method as claimed in claim 1, further comprising determining a selection of reachable systems for maintenance based on said determining the position and/or the orientation of the mobile computer of the service technician by way of the localization services of the private local radio network.

6. The method as claimed in claim 5, further comprising proposing to the service technician the selection of reachable systems determined in said determining a selection of reachable systems for maintenance.

7. The method as claimed in claim 1, wherein the private local radio network is a radio network according to 5G mobile telephony standard and higher or WiFi-6 and higher or UWB standard or GNSS.

8. The method as claimed in claim 1, wherein the conveying system comprises at least one of a roller conveyor, a belt conveyor, and an overhead conveyor, and wherein the warehousing system comprises at least one of a rack serving apparatus, shuttles, and lifts, and wherein the order-picking system comprises at least one of a manual picking station, an automated picking station, and a robot controlled picking station, and wherein the sorting system comprises at least one of a continuous-loop sorter, a tilt tray sorter, a cross-belt sorter, a Bombay sorter, a push tray sorter, a linear sorter, and a slat and shoe sorter.

9. A method for maintaining, commissioning and checking systems in warehouses by permitting a mobile computer of and transported by a service technician that makes wireless contact with a controller of the system take control of the system, said method comprising:
determining the position of the mobile computer of the service technician in a warehouse by way of localization services of a local radio network;
confirming the system in the warehouse for which control is sought is visible by the service technician based on the determined position of the mobile computer; and
permitting via a central controller the mobile computer to take control of the system upon said confirming the system is visible by the service technician based on the determined position of the mobile computer of the service technician;
wherein the local radio network is installed in the warehouse and the system in the warehouse comprises a conveying system, a warehousing system, an order picking system and/or a sorting system.

10. The method as claimed in claim 9, wherein a position of the mobile computer whereby the system is visible by the service technician is determined when the mobile computer is within a predetermined proximity of the system.

11. The method as claimed in claim 9, further comprising determining the orientation of the mobile computer by way of the local radio network, and wherein said permitting the mobile computer to take control of the system is further based on the determination of the orientation of the mobile computer.

12. The method as claimed in claim 9, wherein said determining the position of the mobile computer is carried out by a locating service on the mobile computer in the local radio network, and the central controller permits or denies the taking of control of the system by the mobile computer on the basis of the result.

13. The method as claimed in claim 9, further comprising determining a selection of reachable systems for maintenance based on said determining the position and/or the orientation of the mobile computer of the service technician by way of the localization services of the local radio network.

14. The method as claimed in claim 13, further comprising proposing to the service technician the selection of reachable systems determined in said determining a selection of reachable systems for maintenance.

15. The method as claimed in claim 9, wherein the local radio network is a private local radio network.

16. The method as claimed in claim 15, wherein the private local radio network is a radio network according to 5G mobile telephony standard and higher or WiFi-6 and higher or UWB standard or GNSS.

17. The method as claimed in claim 9, wherein the conveying system comprises at least one of a roller conveyor, a belt conveyor, and an overhead conveyor, and wherein the warehousing system comprises at least one of a rack serving apparatus, shuttles, and lifts, and wherein the order-picking system comprises at least one of a manual picking station, an automated picking station, and a robot controlled picking station, and wherein the sorting system comprises at least one of a continuous-loop sorter, a tilt tray sorter, a cross-belt sorter, a Bombay sorter, a push tray sorter, a linear sorter, and a slat and shoe sorter.

* * * * *